(12) United States Patent
Schröter et al.

(10) Patent No.: US 12,535,161 B2
(45) Date of Patent: Jan. 27, 2026

(54) FLUID CONNECTION

(71) Applicant: Fränkische Industrial Pipes GMBH & CO. KG, Königsberg (DE)

(72) Inventors: Sören Schröter, Königsberg (DE); Johannes Barfuss, Königsberg (DE); Richard Valenta, Trebic (CZ)

(73) Assignee: Fränkische Industrial Pipes GmbH & Co. KG, Königsberg (DE)

( * ) Notice: Subject to any disclaimer, the term of this patent is extended or adjusted under 35 U.S.C. 154(b) by 0 days.

(21) Appl. No.: 18/727,152

(22) PCT Filed: Jan. 13, 2023

(86) PCT No.: PCT/EP2023/050772
§ 371 (c)(1),
(2) Date: Jul. 8, 2024

(87) PCT Pub. No.: WO2023/139000
PCT Pub. Date: Jul. 27, 2023

(65) Prior Publication Data
US 2025/0075834 A1    Mar. 6, 2025

(30) Foreign Application Priority Data

Jan. 18, 2022 (DE) .................... 10 2022 101 100.3

(51) Int. Cl.
*F16L 37/086* (2006.01)
(52) U.S. Cl.
CPC .................................. *F16L 37/086* (2013.01)
(58) Field of Classification Search
CPC ... F16L 37/084; F16L 37/086; F16L 37/0841; F16L 37/12; F16L 37/1225; F16L 37/142; F16L 37/144; F16L 37/148; F16L 37/14
See application file for complete search history.

(56) References Cited

U.S. PATENT DOCUMENTS 4,541,457 A    9/1985    Blenkush
6,112,855 A    9/2000    Camacho et al.
(Continued)

FOREIGN PATENT DOCUMENTS

DE    102018219932 A1    5/2020
DE    102020204825 A1    10/2021
(Continued)

OTHER PUBLICATIONS

Translation WO2021/209212 (Year: 2021).*
(Continued)

*Primary Examiner* — Aaron M Dunwoody
(74) *Attorney, Agent, or Firm* — Kilpatrick Townsend & Stockton LLP

(57) ABSTRACT

A fluid coupling may include a receiving element, a securing element, a retaining element and a plug-in element. The securing element may be displaceable between a release position and a locking position. The securing element being may be engaged with the retaining element in the release position of the securing element. The plug-in element may allow the securing element to be displaced. The fluid coupling may include a spring element which exerts a spring force on the securing element so that the securing element is preloaded in the direction of the locking position so that, when the plug-in element is inserted into the receiving space of the receiving element, the securing element is displaced out of the release position into the locking position due to the spring force of the spring element.

15 Claims, 8 Drawing Sheets

(56) References Cited

U.S. PATENT DOCUMENTS 11,920,713 B2     3/2024  Schröter
2023/0184361 A1   6/2023  Schröter et al.

FOREIGN PATENT DOCUMENTS

WO      2020104504   A1      5/2020
WO      WO2021/209212    *   3/2021   .......... F16L 37/0989
WO      2021209212   A1     10/2021

OTHER PUBLICATIONS

German Application No. 102022101100.3, Search Report mailed Sep. 20, 2022, 5 pages.
International Application No. PCT/EP2023/050772, International Search Report and Written Opinion mailed Mar. 10, 2023, 10 pages.

* cited by examiner

FLUID CONNECTION

CROSS REFERENCE TO RELATED APPLICATIONS

This application is a U.S. national phase of International Patent Application No. PCT/EP2023/050772 filed on Jan. 13, 2023, which claims priority to German Patent Application No. 10 2022 101 100.3, filed in Germany on Jan. 18, 2022. The entire contents of both applications are hereby incorporated herein by this reference.

The present invention relates to a fluid coupling comprising a receiving element, a securing element, a retaining element formed separately from the securing element, and a plug-in element, the plug-in element being capable of being inserted into a receiving space of the receiving element along an insertion axis, the securing element being designed to be displaceable between a release position and a locking position along a displacement axis, the securing element being designed to, in its release position, engage with the retaining element without a plug-in element inserted into the receiving space of the receiving element, in such a way that a displacement of the securing element out of the release position in the direction of the locking position is prevented, the plug-in element being designed to interact with the retaining element when the plug-in element is inserted into the receiving space of the receiving element in such a way that a displacement of the securing element out of the release position into the locking position is made possible.

The applicant has been selling fluid couplings for many years, via which a first fluid line can be connected to a second fluid line. Couplings are known in which a plug-in element of a first fluid line can be inserted into a receiving element of a second fluid line. A manually operable securing element can then prevent the plug-in element from becoming detached from the receiving element.

However, it may be desirable, in particular in an installation situation that is difficult to access, for the plug-in element to be automatically secured in the receiving element.

It is therefore the object of the present invention to provide a fluid coupling which has improved operability, in particular which allows for automatic securing when a coupling has taken place.

This object is achieved according to the invention by a for the coupling, comprising a receiving element,
a securing element,
a retaining element formed separately from the securing element, and
a plug-in element,
wherein the plug-in element can be inserted into a receiving space of the receiving element along an insertion axis,
wherein the securing element is designed to be displaceable between a release position and a locking position along a displacement axis,
wherein the securing element is designed to, in its release position, engage with the retaining element without a plug-in element inserted into the receiving space of the receiving element in such a way that a displacement of the securing element out of the release position in the direction of the locking position is prevented,
wherein the plug-in element is designed to interact with the retaining element when the plug-in element is inserted into the receiving space of the receiving element in such a way that a displacement of the securing element out of the release position into the locking position is made possible,
characterized in that the fluid coupling further comprises a separately designed spring element which is designed to exert a spring force on the securing element so that the securing element is preloaded in the direction of its locking position, such that when the plug-in element is inserted into the receiving space of the receiving element, the securing element is displaced out of the release position into the locking position due to the spring force of the spring element.

In other words, insertion of the plug-in element into the receiving element influences the retaining element in such a way that a displacement of the securing element into the locking position is made possible, whereupon the spring force provided by the spring element automatically displaces the securing element into the locking position, i.e. without additional actuation by a user, so that the plug-in element is secured in the receiving element.

The fluid coupling according to the invention allows for the element which provides the spring force for actuating the securing element to be formed separately from the retaining element, which prevents the securing element from being displaced out of the release position into the locking position (or releases this displacement). Thus, for example, the plug-in element only has to be displaced against the elastic restoring force of the retaining element, so that insertion of the plug-in element into the receiving element can be made significantly easier, in contrast to the fact that when the plug-in element is inserted into the receiving element a displacement must take place against the spring force of the spring element, which displaces the securing element relative to the plug-in element in order to secure the plug-in element in the receiving element. The spring force of the spring element can therefore be significantly stronger than would be possible if the insertion of the plug-in element into the receiving element were to take place against the spring force of the spring element/securing element, and thus the securing element can withstand significantly higher pull-out forces.

Furthermore, a securing portion on the securing element, which is designed to come into contact with the plug-in element in order to secure it, can be designed in particular with 90° edges on both sides, i.e. without at least one insertion bevel having to be provided on the edge in order to cause a displacement of the securing element upon contact with the plug-in element.

The displacement axis of the securing element can be arranged substantially at right angles to the insertion axis of the plug-in element.

Furthermore, the retaining element can be connectable to the receiving element parallel to the insertion axis of the plug-in element into the receiving element.

In order to connect the plug-in element to the receiving element, the plug-in element can have a portion on its outer circumference in which the outer diameter of the plug-in element changes, wherein the securing element can further comprise the aforementioned securing portion, which is designed to engage with the portion with the changed outer diameter of the plug-in element in the locking position of the securing element in order to prevent an axial displacement of the plug-in element at least in one direction, preferably a detachment direction of the plug-in element and receiving element, along the insertion axis.

In the locking position and/or in the release position of the securing element, this element can be latched in a non-destructively releasable manner with, for example, the receiving element or the retaining element. This can, for example, prevent the securing element from being inadvertently moved out of the locking position or the release position.

In other words, the fluid coupling according to the invention can prevent incorrect locking of the securing element, since the displacement of the securing element is only possible when the plug-in element is pushed sufficiently far into the receiving element, i.e. that a counter-element on the plug-in element, with which the securing element can enter into a positive connection, is already arranged at the position at which the securing element engages with the counter-element in its locking position. It can additionally be provided that the plug-in element in this position has already come into contact with a sealing device which is arranged on the receiving element and/or the retaining element in order to outwardly seal a fluid channel formed in the plug-in element.

The receiving element and/or the securing element and/or the retaining element and/or the plug-in element can comprise a thermoplastic material, in particular polyamide. In particular, at least one of these elements can comprise a glass-fiber-reinforced polyamide, in particular PA66 GF30. The retaining element can in particular comprise PA11. However, the plug-in element can also comprise a metal.

In particular, the fluid coupling can further comprise a separately formed support element which has a contact portion against which the spring element rests, wherein the support element is connectable to the receiving element and the spring force of the spring element acts between the support element and the securing element. For example, the spring element can first be inserted between the support element and the securing element, in particular in a pre-tensioned manner, and then the unit consisting of the support element, securing element and spring element can be connected to the receiving element. Of course, it is also conceivable that the securing element and/or the support element is/are first connected to the receiving element and then the spring element is arranged thereon.

The support element can comprise a thermoplastic plastics material, for example polyamide, in particular a glass-fiber-reinforced polyamide, for example PA66 GF30.

In the locking position of the securing element, a radially outer side of the contact portion of the support element, viewed with respect to a longitudinal center axis of the receiving element, can be substantially flush with a radially outer side of the securing element, also viewed with respect to the longitudinal center axis of the receiving element. In particular, the support element can be approximately Z-shaped in a side view, wherein the upper cross-stroke of the Z-shape can be formed by the contact portion of the support element. A latching device can be provided on the lower cross-stroke of the Z-shape, which device is designed to engage with a corresponding counter-latching device of the receiving element. In other words, viewed in a radial direction of the fluid coupling, the contact portion of the support element can be arranged further outward than a connecting portion of the support element with the receiving element.

In a further development of the present invention, the retaining element can comprise at least one resilient retaining arm which extends parallel to the direction of insertion of the plug-in element into the receiving space, and the plug-in element can be designed to displace the at least one resilient retaining arm of the retaining element radially outward when the plug-in element is inserted into the receiving space of the receiving element, in order to thus allow a displacement of the securing element out of the release position into the locking position. In particular, the retaining element can comprise two resilient retaining arms which are arranged diametrically opposite one another with respect to the receiving space. The displacement of the two retaining arms radially outward can thus take place in a common plane. This plane can advantageously be aligned orthogonally to the direction of displacement of the securing element out of the release position into the locking position.

In this context, the securing element can have at least one projection on the portion which engages with the resilient retaining arm in such a way that a displacement of the securing element out of the release position in the direction of the locking position is prevented, which projection is designed to engage with the resilient retaining arm in such a way that a displacement of the resilient retaining arm radially inward is substantially prevented and/or that a displacement of the portion of the securing element radially outward is substantially prevented. This means that the portion of the securing element which contacts a respective resilient retaining arm in the release position can engage around the resilient retaining arm on a radially inner side in order to provide a positive connection against an undesirable movement as described above.

Furthermore, the portion of the securing element which engages with the resilient retaining arm in such a way that a displacement of the securing element out of the release position in the direction of the locking position is prevented can pass outward through an opening in the receiving element in the locking position of the securing element, in particular wherein the opening on the receiving element can be arranged on a side diametrically opposite the spring element. In this way, it can be seen from the outside, for example in a direction which is substantially parallel to the direction of insertion of the plug-in element into the receiving element, whether the securing element is in the locking position or not. In order to simplify such recognition, at least the portion of the securing element which passes through the opening, in particular the entire security element, can be made with a color different from that of the receiving element.

The retaining arm can also taper towards its free end and/or a radially outer side of the retaining arm with respect to a longitudinal center axis of the receiving element can have a step at which the outer side, viewed in a direction towards its free end, recedes radially inward. This makes it possible for the retaining arm to be displaced further radially outward, in comparison to a retaining arm which, with the same free space in the receiving element, extends straight on its radially outer side.

Advantageously, the spring element can be a helical spring, in particular a compression spring, made of a metal, in particular spring steel. In particular, by forming the spring element from metal, creep of the spring element and thus a decrease in the spring force can be avoided during a longer downtime spent by the securing element in the release position.

In particular, the support element can be designed to be latched to the receiving element in such a way that it is connected to the receiving element such that it cannot be detached non-destructively. As already described above, the support element can thus provide a secure seating for the spring element.

In advantageous embodiments of the present invention, the receiving element can have at least one through-opening which extends from an outer side radially inward and substantially orthogonal to both the direction of insertion of the plug-in element into the receiving element and to the direction of displacement of the securing element. This through-opening can in particular extend substantially in a direction in which a retaining arm adjacent to the through-opening can be displaced radially outward. For example, each resilient retaining arm can be assigned a through-opening. With reference to the common plane of displacement of the two resilient retaining arms described above, the two associated through-openings can also extend in or parallel to this common plane. In the case of a parallel extension of the through-openings to the common plane, the through-openings can in particular be arranged on a side of the plane which is opposite the side of the arrangement of the securing element in the release position. Thus, the through-openings can create more free space in the receiving space of the receiving element and in this way increase the displacement path of the securing element out of the release position into the locking position. The fact that the through-openings can extend completely laterally through a wall of the receiving element can be advantageous in particular in the case in which the receiving element is manufactured using an injection molding process, since in this case cores can be inserted laterally and pulled out after the receiving element has been manufactured.

In a state in which the securing element is arranged on the receiving element, in particular in the locking position, a free space can be arranged between a portion of the securing element and the support element, which free space is suitable for inserting a tool in order to thereby displace the securing element from the locking position into the release position. For example, a slotted screwdriver can be inserted into the free space in order to make it possible to lever the securing element from the locking position into the release position. In order to be able to insert a tool better into the free space, the support element can have a recess which extends into the free space arranged on the securing element. The securing element can also be lifted out of the locking position by turning the tool, for example.

Furthermore, a securing portion of the securing element, which in the locking position of the securing element is engaged with a counter-element of the plug-in element, viewed along the direction of insertion of the plug-in element into the receiving element, can have a greater longitudinal extension than a longitudinal extension of the counter-element. A counter-element can in particular be a circumferentially annular projection or collar on the plug-in element. Alternatively, the counter-element on the plug-in element can also be designed as a recess. A large longitudinal extension of the securing portion of the securing element can increase a stability of the securing element with respect to pull-out forces of the plug-in element from the receiving element while the securing element is in the locking position.

Advantageously, the retaining element can be designed as a component separate from the receiving element and can be designed to latch with the receiving element, in particular using at least two, preferably three, latching pairs. A "latching pair" can be considered here as an interaction of at least one projection and at least one recess which are designed to engage with one another, wherein, in the case of multiple projections or multiple recesses per latching pair, the respective projections or the respective recesses of a latching pair can be arranged locally in grouped fashion. The latching of the retaining element with the receiving element can in particular be designed to be such that it cannot be non-destructively detached.

The retaining element can have at least two, in particular non-resilient, projections which are designed to engage in at least two corresponding recesses of the receiving element in order to provide guidance of the retaining element when it is inserted into the receiving element. In this way, a predetermined rotational alignment of the retaining element with respect to the receiving element can be clearly defined, so that misalignment of the retaining element with respect to the receiving element can be avoided when assembling these two components.

The recesses of the receiving element can extend into the receiving element substantially parallel to the direction of insertion of the plug-in element into the receiving element. In particular, a recess of the receiving element which is designed to receive a corresponding projection of the retaining element can have a substantially longer, for example more than five times as long, longitudinal extension than a longitudinal extension of an associated projection. Such a recess of the receiving element can have a greater longitudinal extension, starting from a side of the receiving element at which the plug-in element is inserted into the receiving space, than the longitudinal extension of the resilient retaining arms viewed from the above-mentioned side of the receiving element to the free end of the retaining arms, in the state in which the retaining element is mounted on the receiving element. The projections of the retaining element can extend in the common plane of the resilient retaining arms described above. In this way, the recesses can provide the necessary free space so that the resilient retaining arms can be displaced radially outward when the plug-in element is inserted into the receiving space of the receiving element.

Viewed in a direction orthogonal to this common plane, the projections and the resilient retaining arms of the retaining element can have substantially the same height. Alternatively, the projections can be designed with a greater height than the resilient retaining arms. The features described above can simplify the manufacture of the retaining element and/or the receiving element, in particular using an injection molding process.

Furthermore, the fluid coupling can comprise at least one indicator element, in particular a machine-readable code, such as a DMC code element, a bar code, a QR code, or the like. The at least one indicator element can be arranged such that, when the plug-in element is not connected to the receiving element, the indicator element is at least partially concealed toward the outside, so that recognition or machine reading of the corresponding indicator element is prevented. In the correctly connected state of the fluid coupling, the at least one indicator element can be moved into a position such that it is recognizable or machine-readable. For example, an indicator element can be arranged on each of two side surfaces of the securing element, which indicator element is concealed by a part of the receiving element in the release position, but is arranged in alignment with a corresponding opening in the receiving element in the locking position, so that the indicator element on the securing element can be recognized or detected from the outside.

Additionally or alternatively, an indicator element can be arranged on a pivoting element, wherein the pivoting element is designed to be pivotable from a first position associated with the release position of the fluid coupling into a second position associated with the locking position of the fluid coupling. In particular, the pivoting element can be arranged so as to be pivotable relative to the receiving element. The pivoting element can have a projection which projects into the receiving space of the receiving element, so that, upon insertion of the plug-in element into the receiving space of the receiving element, the plug-in element acts on the projection of the pivoting element so as to bring about a pivoting of the pivoting element from the first position into the second position.

In the first position of the pivoting element, the indicator element attached to the pivoting element can be at least partially concealed by a portion of the receiving element, whereas the indicator element of the pivoting element in the second position of the pivoting element, i.e. the position associated with the complete insertion of the plug-in element into the receiving space of the receiving element, can be recognized or detected from outside the fluid coupling.

In particular, the pivoting element can be designed with a latching device which can enter into latching engagement with that element, for example the receiving element, relative to which the pivoting element can be displaced from its first position into its second position. In this way, it can be ensured that the pivoting element is not displaced inadvertently and, in particular, is not transferred from the first position to the second position of the pivoting element until the plug-in element is sufficiently inserted into the receiving space of the receiving element and the securing element can be displaced out of the release position into the locking position.

In the locking position of the securing element, the plug-in element can act on the pivoting element, in particular on the projection of the pivoting element, in such a way that a displacement of the pivoting element out of the second position is prevented.

The securing element can further comprise at least one recess which is suitable for engaging with at least one projection on the retaining element. Thus, a recess of the securing element can engage with a latching element of the retaining element, which in turn is designed to secure the retaining element and/or the securing element to the receiving element, in particular against axial tensile forces counter to the direction of insertion of the plug-in element. Alternatively or additionally, a recess of the securing element can engage with a stabilizing web of the retaining element (in particular, the fluid coupling has two symmetrically arranged recesses on the securing element and two matching stabilizing webs on the retaining element, or vice versa), which in turn is designed in interaction with the corresponding recess to secure the securing element on the receiving element, in particular against axial tensile forces counter to the direction of insertion of the plug-in element.

In the following, the present invention will be described in greater detail on the basis of an exemplary embodiment, with reference to the accompanying drawings. In the figures:

FIG. 2b is a further side cross-sectional view of the embodiment of FIG. 1 without inserted plug-in element, along the sectional line IIb-IIb of FIG. 2a;

FIG. 2c is a further side cross-sectional view of the embodiment of FIG. 1 without inserted plug-in element, along the sectional line IIc-IIc of FIG. 2a;

FIG. 3b is a further side cross-sectional view of the embodiment of FIG. 1 with inserted plug-in element, along the sectional line IIIb-IIIb of FIG. 3a;

FIG. 3c is a further side cross-sectional view of the embodiment of FIG. 1 with inserted plug-in element, along the sectional line IIIc-IIIc of FIG. 3a;

Figure 1:
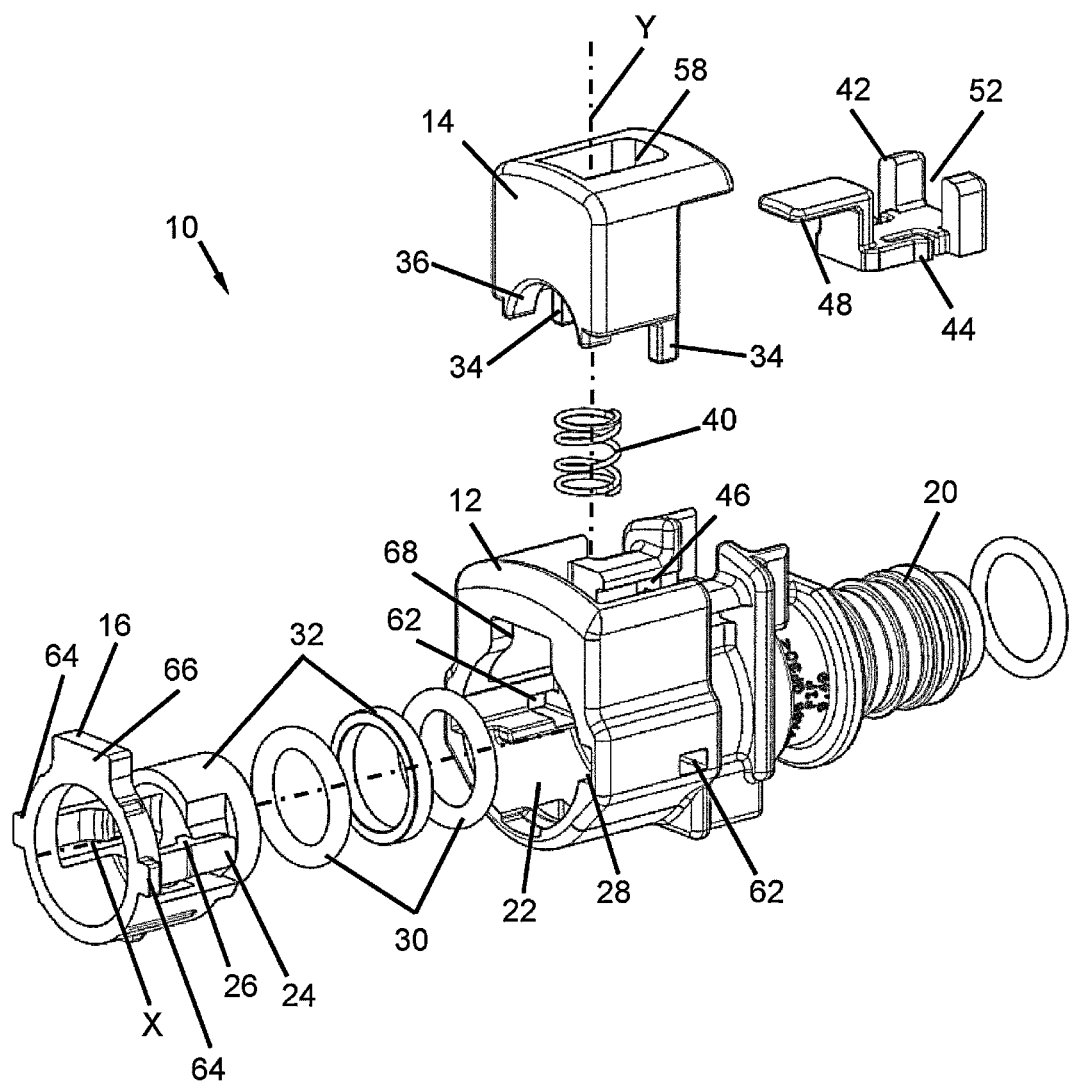
FIG. 1 is an exploded perspective view of a fluid coupling according to the invention.

In FIG. 1, a fluid coupling according to the invention is designated overall by reference sign 10. The fluid coupling 10 comprises a receiving element 12, a securing element 14, a retaining element 16, and a plug-in element 18 (see FIG. 3a).

The receiving element 12 has a flange 20 at its end shown on the right in FIG. 1, which is designed to be connectable to a fluid line. At its end opposite the flange 20, the receiving element 12 has a receiving space 22 into which the plug-in element 18 can be inserted (see FIGS. 2a and 3a).

The retaining element 16 is designed here as a ring on which two radially resilient retaining arms 24 are arranged diametrically opposite one another. Each of the retaining arms 24 has a projection 26 extending radially inward. The retaining arms 24 are received in the receiving element 12 in recesses 28 provided for this purpose. In the case of the annular retaining element 16, when the retaining element 16 is connected to the receiving element 12, the receiving space 22 can also be considered as defined by the central opening of the retaining element 16.

In the embodiment shown in FIG. 1, the retaining element 16, as well as two O-rings 30 and two spacers 32, are connected to the receiving element 12 along an insertion axis X, which here also forms a longitudinal center axis X of the receiving element 12 or of the receiving space 22. One of the two spacers 32 is here integrally connected to the retaining element 16.

The securing element 14 is shown in FIG. 1 in a position detached from the receiving element 12 and can be inserted into the receiving element 12 along a displacement axis Y. In the embodiment shown here, the displacement axis Y is orthogonal to the insertion axis X. At two portions that are diametrically opposite with respect to the axis X, the securing element 14 has two projections 34 on its outside, which are designed to come into contact with the retaining arms 24 in a release position P1 (see FIG. 2b), wherein the contact here takes place in the direction of the displacement axis Y, i.e. a retaining arm 24 and an associated projection 34 are arranged adjacent to one another in the direction of the displacement axis Y. The retaining arms 24 here prevent further displacement of the securing element 14 into the receiving element 12 along the displacement axis Y. Furthermore, the securing element 14 has a securing portion 36 which is designed to engage with a corresponding counter-element 38 (see FIG. 3a) of the plug-in element 18 in order to prevent displacement of the plug-in element 18 out of the receiving element 12 into a locking position P2 (see FIG. 3b).

The fluid coupling 10 also comprises a spring element 40 and a support element 42. The support element 42 has a latching device 44 which is designed to engage with corresponding recesses 46 on the receiving element 12 in order to secure the support element 42 to the receiving element 12. In a position that is raised (radially outwardly offset) relative to the latching device 44, the support element 42 has a contact portion 48 against which one end of the spring element 40 rests. The other end of the spring element 40 rests against the securing element 14 in a recess 50 provided for this purpose (see e.g. FIG. 2a).

Figure 4:
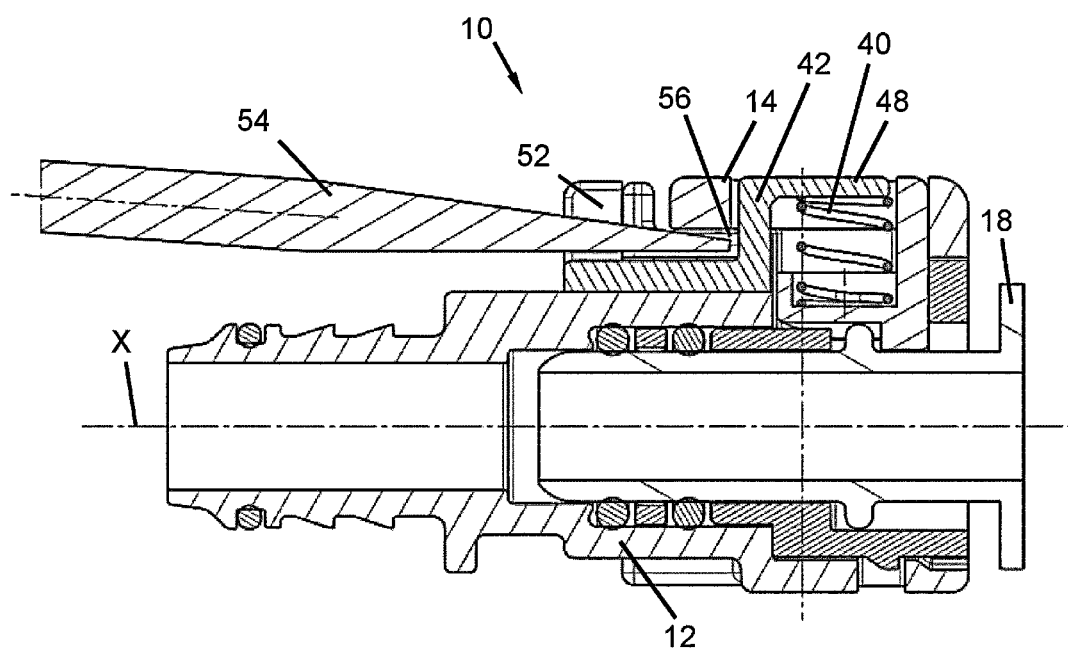
FIG. 4 is a side cross-sectional view of the embodiment of FIG. 1 with inserted tool.

The support element 42 has an opening 52 which is designed so that, as also shown in FIG. 4, a tool 54 (here a slotted screwdriver) can be inserted through the opening 52 and into a free space 56 which is formed between the securing element 14 and the support element 42. By turning and/or levering the tool 54 in the position shown in FIG. 4, the securing element 14 can be displaced against the spring force of the spring element 40 from the locking position P2 in the direction of a release position P1 (see FIG. 2b). If the securing element 14 is moved far enough out of the locking position P2 in the direction of the release position P1, the plug-in element 18 can be pulled out of the receiving element 12 along the axis X opposite the direction of insertion.

Furthermore, it can be seen in FIG. 1 that the securing element 14 has an opening 58 extending along the displacement axis Y, which is shaped such that the contact portion 48 can enter the opening 58. Thus, in the locking position P2, the radially outer side of the contact portion 48 with respect to the axis X can be arranged substantially flush with a radially outer side of the securing element 14, which here surrounds the opening 58.

Figure 2A:
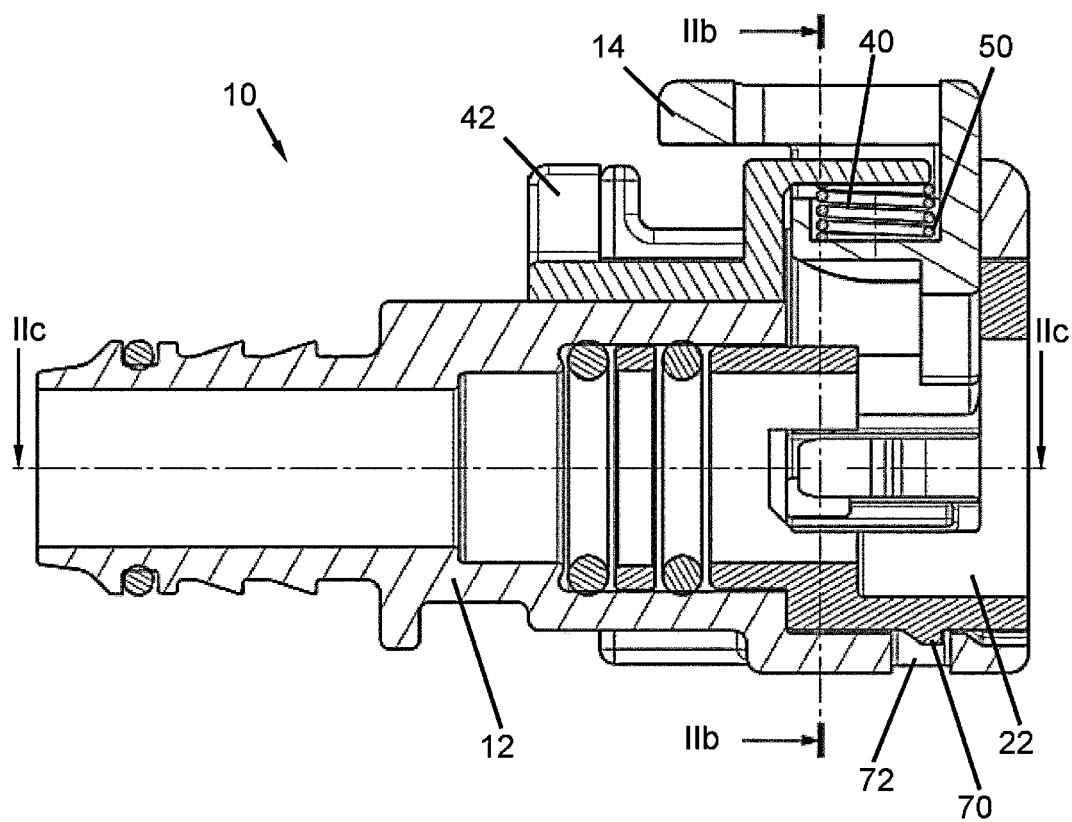
FIG. 2a is a side cross-sectional view of the embodiment of FIG. 1 without inserted plug-in element.

FIG. 2a shows a side cross-sectional view of the embodiment of a fluid coupling 10 according to the invention shown in FIG. 1 in the assembled state, with the exception of the plug-in element 18. It can be seen that the spring element 40 between the support element 42 and the securing element 14 is almost completely compressed.

Figure 2B:
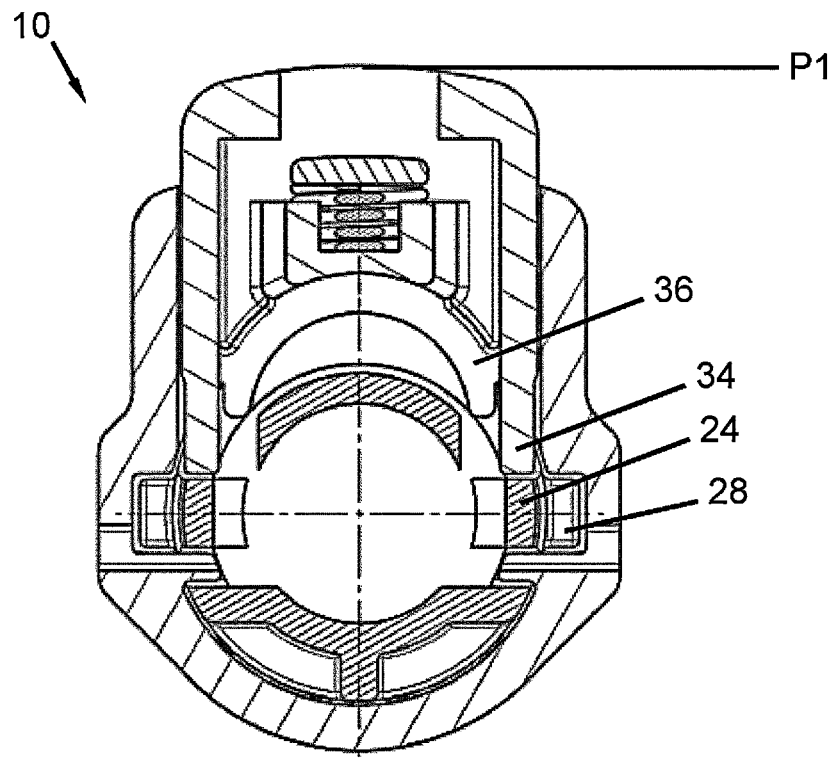

In the further side cross-sectional view of FIG. 2b, it can be seen that the resilient retaining arms 24 are in contact with the projections 34 of the securing element 14, whereby a displacement, actuated by the spring force of the spring element 40, of the securing element 14 out of the release position P1 shown in FIG. 2b relative to the receiving element 12 is prevented.

Figure 2C:
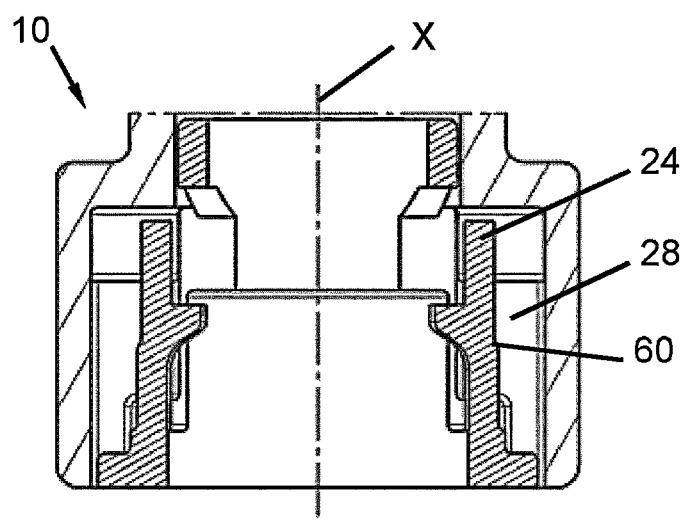

In the further side cross-sectional view of FIG. 2c, it is shown that the resilient retaining arms 24 are arranged in the respective recesses 28 in a non-deflected position substantially parallel to the axis X. It can also be seen here that the radially outer sides of the resilient arms 24 with respect to the longitudinal center axis X have a step 60 at which the radially outer side of each resilient arm 24 recedes radially inward by a predetermined height. This allows a larger displacement path of the retaining arms 24 radially outward, as can be seen in FIG. 3c.

Figure 3A:
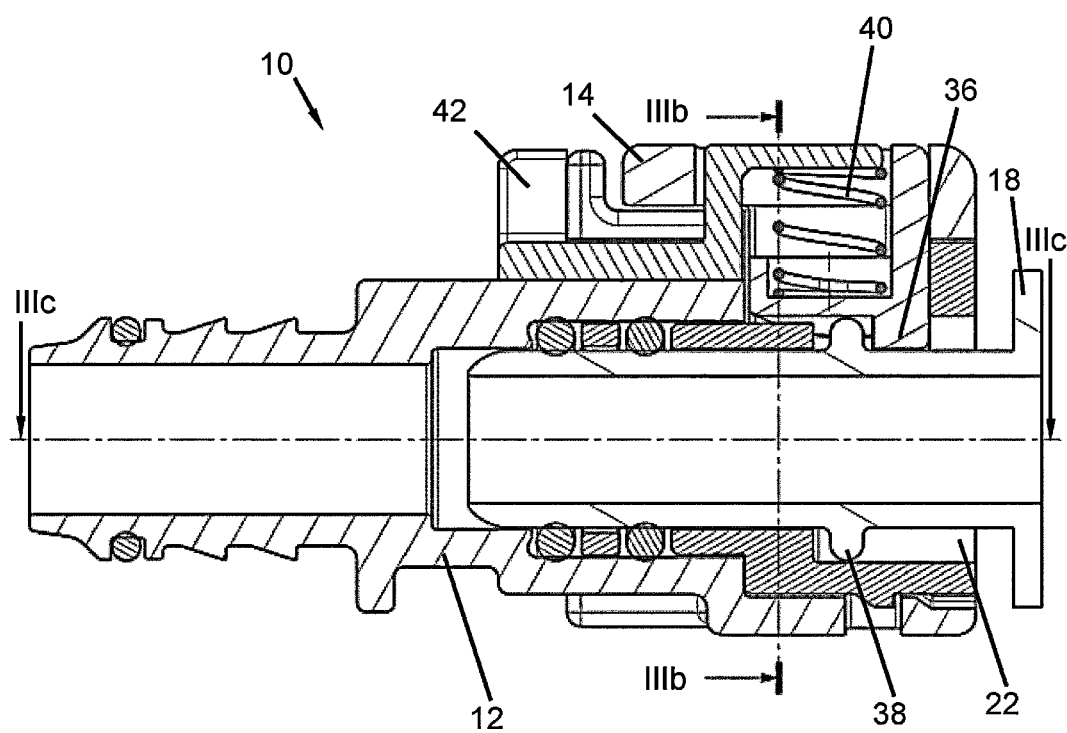
FIG. 3a is a side cross-sectional view of the embodiment of FIG. 1 with inserted plug-in element.

FIG. 3a shows a sectional view analogous to FIG. 2a, wherein the plug-in element 18 is inserted into the receiving space 22 of the receiving element 12. The counter-element 38 of the plug-in element 18, which protrudes annularly here, has come into contact with the projections 26 of the resilient retaining arms 24 of the retaining element 16 (see FIG. 3c) and has displaced the resilient retaining arms 24 radially outward.

Figure 3B:
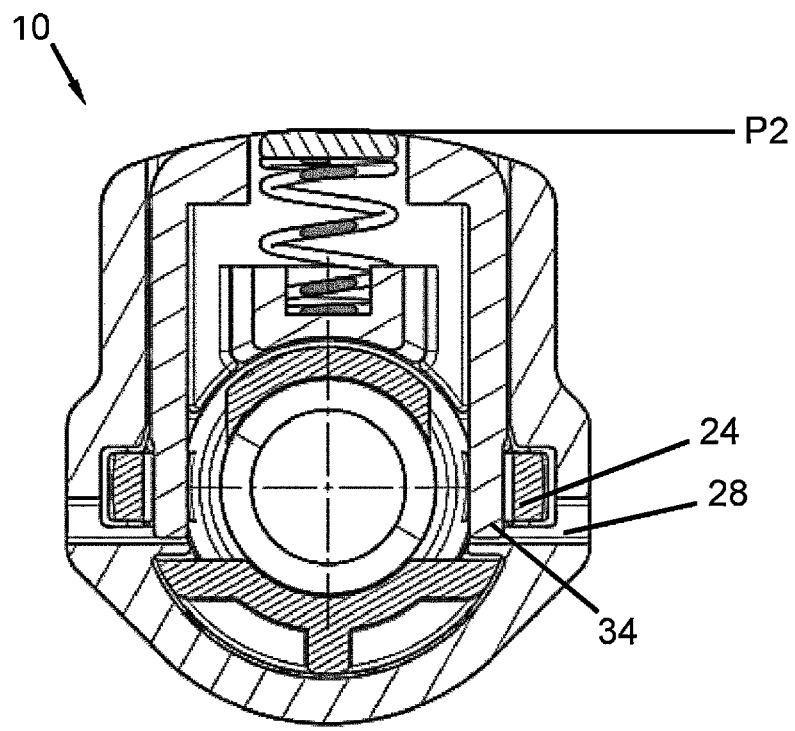

The resilient retaining arms 24 are disengaged from the projections 36 of the securing element 14 in FIG. 3b, so that a displacement of the securing element 14 out of the release position P1 according to FIG. 2b into a locking position P2 according to FIG. 3b can be carried out, which displacement is driven by the spring force of the spring element 40.

Figure 3C:
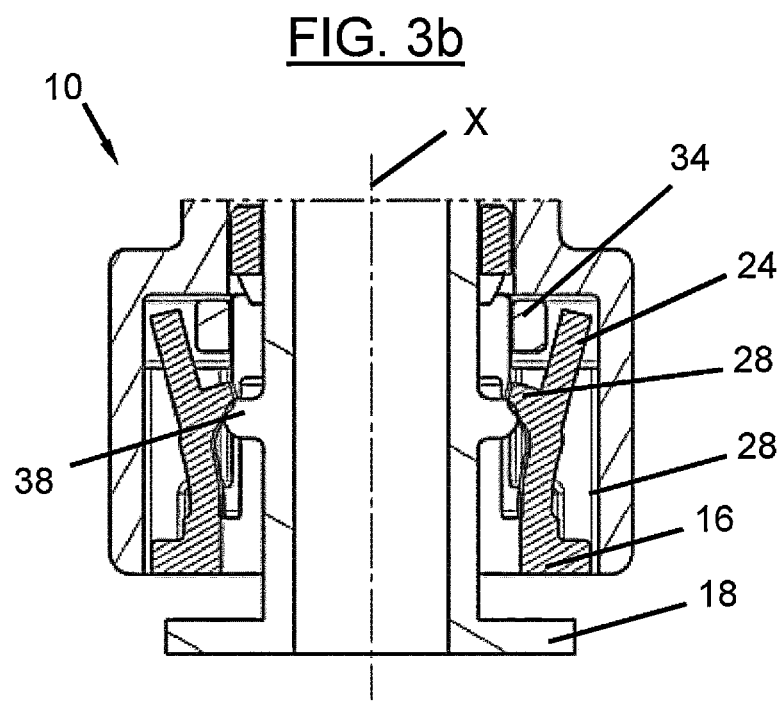

In the locking position P2 shown in FIGS. 3a to 3c, the annular counter-element 38 of the plug-in element 18 is partially engaged from behind by the securing portion 36 of the securing element 14, so that a displacement of the plug-in element 18 out of the receiving element 12 along the axis X is prevented. Of course, it is conceivable to additionally provide a rotational securing of the plug-in element 18 relative to the securing element 14 or the receiving element 12. In the locking position P2, the projections 34 of the securing element 14 rest against surfaces which are created by lateral through-openings 62 which extend through the receiving element 12 in a direction which is oriented both orthogonal to the longitudinal center axis X and to the displacement axis Y. The through-openings 62 produce, by means of a corresponding intersection in each case with the recesses 28, depressions into which the projections 34 of the securing element 14 can enter in order to increase a displacement path of the securing element 14 out of the release position P1 into the locking position P2. As a result, a radial extension of the counter-element can also be increased, which in turn can increase the resistance of the securing device against pull-out forces of the plug-in element 18 from the receiving element 12.

Referring again to FIG. 1, it can be seen that the retaining element 16 here has two lateral projections 64 which are designed to engage in the recesses 28. In order to clearly define a rotational alignment of the retaining element 16 relative to the receiving element 12, a further projection 66 is provided on the retaining element 16, which projection is designed to engage in a matching recess 68 of the receiving element 12.

In a combined view of FIGS. 2a to 3c, it also becomes clear that in the embodiment shown here, the lateral projections 64, the resilient retaining arms 24, the recesses 28 and the relative displacement of the resilient retaining arms 24 extend radially outward substantially in the same common plane, which is formed for example by the plane of the drawing in FIGS. 2c and 3c.

In this embodiment, the retaining element 16 is designed as a separate component from the receiving element 12 and is connected to it using latching pairs. For example, it can be seen in FIG. 2a that a projection 70 of the retaining element 16 engages in a window-like recess 72 (here a through-opening through the wall of the receiving element 12) as soon as the retaining element 16 has been completely inserted into the receiving element 16.

Figure 5:
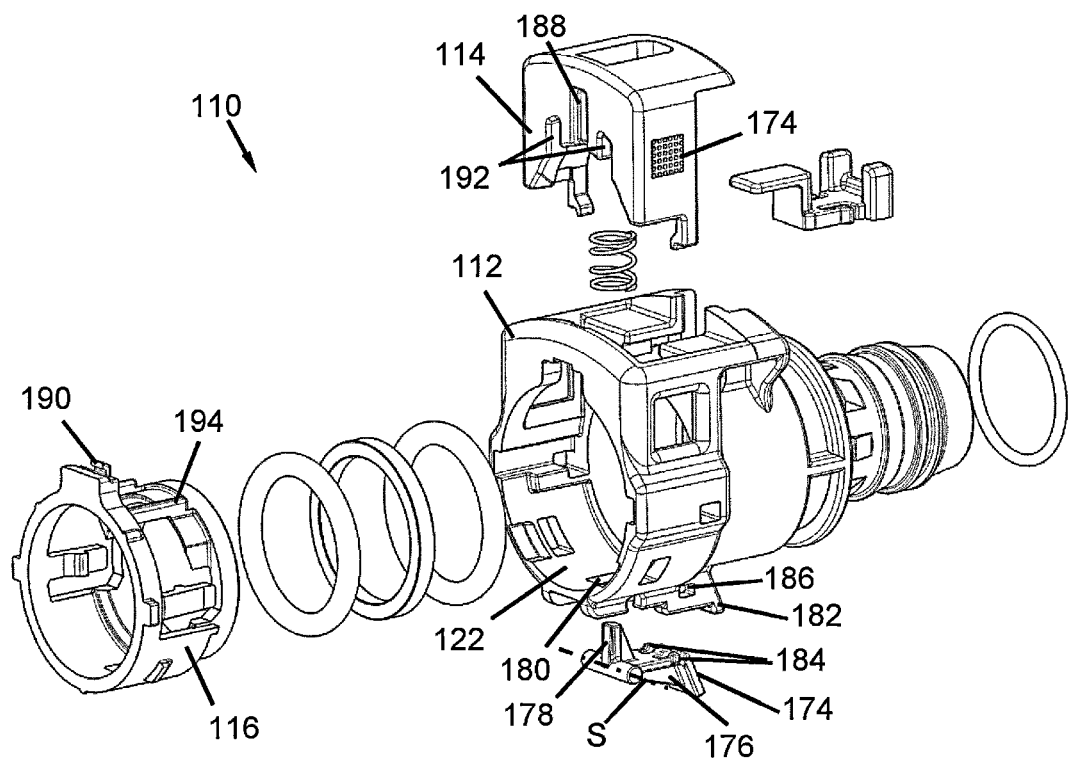
FIG. 5 is an exploded perspective view of a second embodiment of a fluid coupling according to the invention.

FIG. 5 shows a second embodiment of the fluid coupling 10, provided with reference sign 110. It should be noted at this point that the second embodiment of the fluid coupling 110 is largely, at least functionally, identical to the first embodiment of the fluid coupling 10, so that the following discussion focuses on the differences between the second embodiment of the fluid coupling 110 and the first embodiment of the fluid coupling 10. Components of the fluid coupling 110 analogous to those of the fluid coupling 10 will be designated with reference signs which are increased by the number 100 compared to the fluid coupling 10. Furthermore, reference is made to the description with respect to the first embodiment of the fluid coupling 10.

The fluid coupling 110 comprises a securing element 114, which has an indicator element 174 on each of the opposite side surfaces (only one is visible in FIG. 5), the indicator element 174 being designed here as a DMC code.

In addition, the fluid coupling 110 comprises a pivoting element 176 which is attached on a receiving element 112 of the fluid coupling 110 so as to be pivotable about a pivot axis S. The pivoting element 176 comprises a projection 178 which projects through an opening 180 of the receiving element 112 into a receiving space 122 such that the projection 178 of the pivoting element 176 comes into contact with a plug-in element 18 (see FIG. 8) when the plug-in element 18 is inserted into the receiving space 122 of the receiving element 112.

A further indicator element 174 is arranged on a corresponding surface of the pivoting element 176, which indicator element, in an initial position of the pivoting element 176 on the securing element 112, is at least partially overlapped by a projection 182 of the securing element 112, so that the indicator element 174 on the pivoting element 176 is not completely recognizable or cannot be detected by machine. This initial position of the pivoting element 176 can also be referred to as a first position of the pivoting element 176, which is associated with the release position of the securing element 114 relative to the receiving element 112.

In order to prevent the pivoting element 176 from being inadvertently displaced from the first position, the pivoting element 176 has a latching device 184 which is designed to engage with a corresponding counter-latching device 186 of the receiving element 112.

Figure 6:
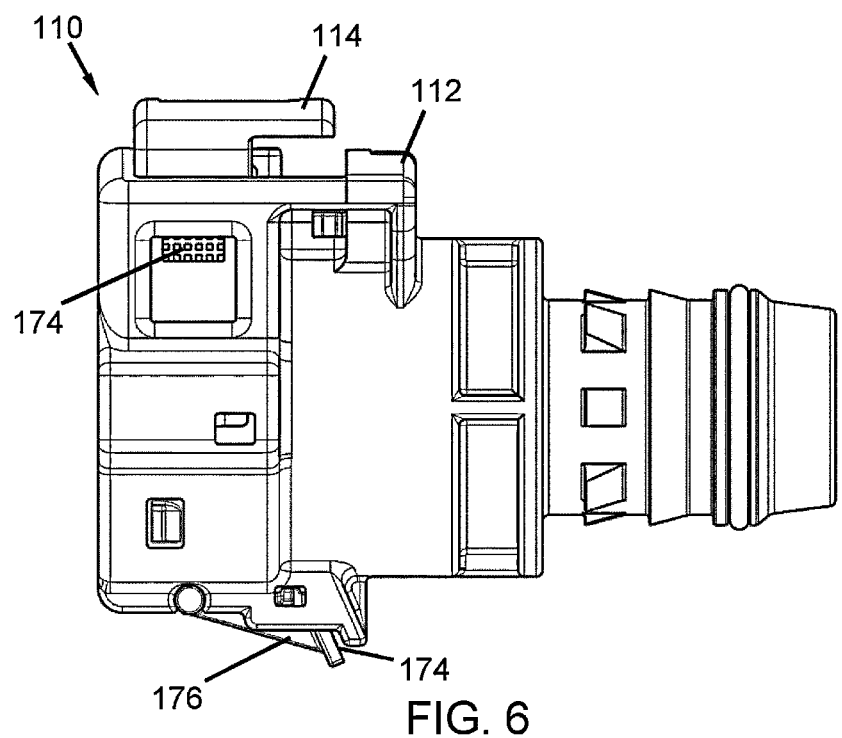
FIG. 6 is a side view of the fluid coupling from FIG. 2 in its release position.

This first position of the pivoting element 176 relative to the receiving element 112 can be seen in FIG. 6. In FIG. 6 it can also be seen that the indicator elements 174 on the securing element 114 and on the pivoting element 176 are partially concealed by the receiving element 112.

If the plug-in element 18 is now inserted into the receiving space 122 of the receiving element 112, the plug-in element comes into contact with the projection 178 of the pivoting element 176 when the securing element 114 can also be displaced out of the release position P1 into the locking position P2. Via the force exerted on the projection 178 of the pivoting element 176 and via the pivoting mechanism about the pivot axis S of the pivoting element 176 relative to the receiving element 112, a force is exerted on the latching device 184 of the pivoting element 176 such that the latching device 184 disengages from the counter-latching device 186 and the pivoting element 176 is displaced from the first position into a second position in which the indicator element 174 arranged on the pivoting element 176 is completely recognizable or detectable from outside the fluid coupling 110.

Figure 7:
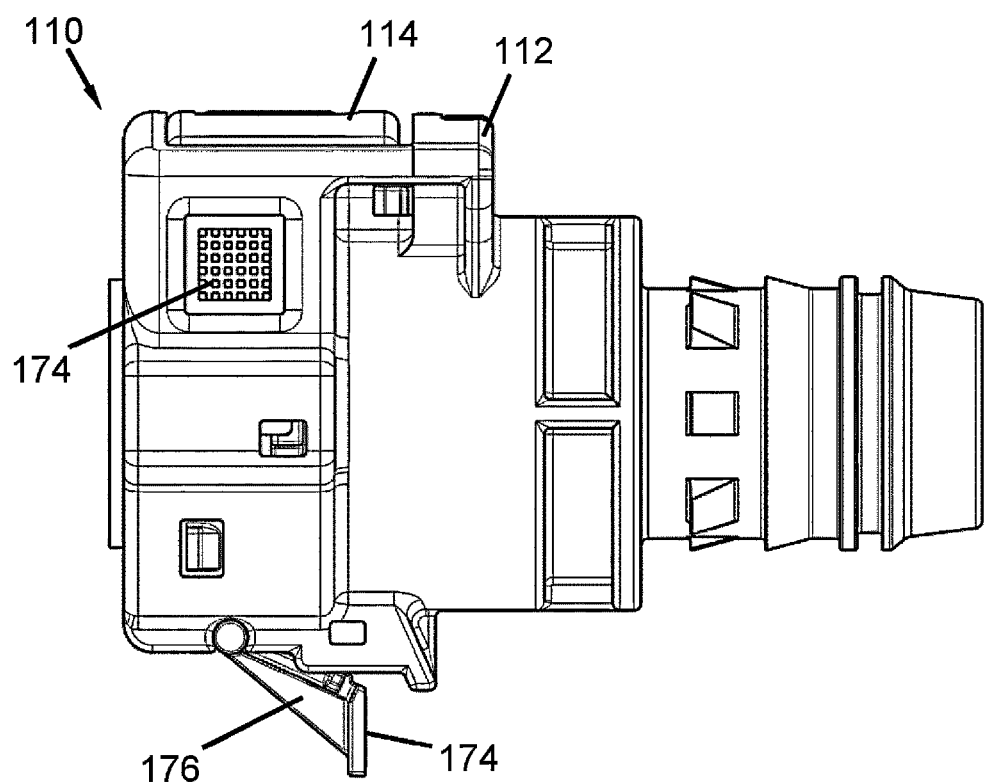
FIG. 7 is a side view of the fluid coupling of FIG. 5 in its locking position.

This state of the pivoting element 176, which is associated with the locking position P2 of the securing element 114 on the receiving element 112, i.e. the second position, is shown in FIG. 7. It can be seen here that the indicator elements 174 of the securing element 114 are also arranged so as to be completely recognizable or machine-detectable from outside through the through-openings of the receiving element 112.

Figure 8:
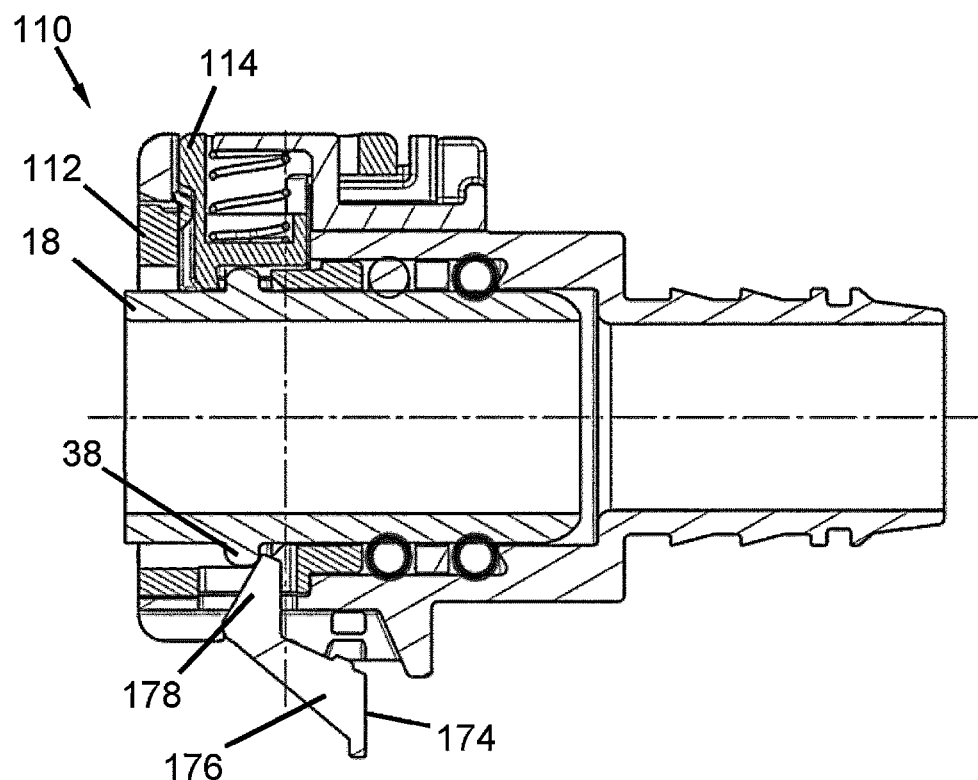
FIG. 8 is a side cross-sectional view of the fluid coupling of FIG. 7.

FIG. 8 shows the locking position P2 of the fluid coupling 110 from FIG. 7 in a side cross-sectional view. In particular, it can be seen that the counter-element 38 of the plug-in element 18, which is designed here as an annular collar running circumferentially, has come into contact with the projection 178 of the pivoting element 176 and has displaced the pivoting element 176 into the second position. Because the plug-in element 18 is prevented from being displaced out of the receiving space 122 of the receiving element 112 via the interaction between the counter-element 38 and the securing element 114, the interaction between the counter-element 38 and the projection 178 of the pivoting element 176 can also prevent the pivoting element 176 from being displaced back in the direction of the first position of the pivoting element 176 in the locked state of the fluid coupling 110.

Referring again to FIG. 5, it can be seen that the embodiment of the fluid coupling 110 shown here has a first recess 188 on the securing element 114, which recess is suitable for engaging with a latching element 190 of the retaining element 116. Thus, the first recess 188 of the securing element 114 in interaction with the latching element 190 of the retaining element 116 can secure the retaining element and/or the securing element on the receiving element, in particular against axial tensile forces opposite the direction of insertion of the plug-in element.

In addition, the embodiment of the fluid coupling 110 shown here has two second recesses 192 on the securing element 114. Each of the two second recesses 192 of the securing element 114 engages correspondingly with an associated stabilizing web 194 of the retaining element 116 (only one of the two stabilizing webs 194 can be seen in FIG. 5). The stabilizing webs 194 of the retaining element 116 are designed to secure, in interaction with the corresponding second recess 192, the securing element on the receiving element, in particular against axial tensile forces opposite the direction of insertion of the plug-in element.

The invention claimed is:

1. Fluid coupling, comprising:
   a receiving element;
   a securing element;
   a retaining element formed separately from the securing element; and
   a plug-in element,
   wherein the plug-in element can be inserted into a receiving space of the receiving element along an insertion axis,
   wherein the securing element is designed to be displaceable between a release position and a locking position along a displacement axis,
   wherein the securing element is designed to, in the release position, engage with the retaining element without a plug-in element inserted into the receiving space of the receiving element, in such a way that a displacement of the securing element out of the release position in a direction of the locking position is prevented,
   wherein the plug-in element is designed to interact with the retaining element when the plug-in element is inserted into the receiving space of the receiving element in such a way that a displacement of the securing element out of the release position into the locking position is made possible,
   wherein the fluid coupling further comprises a spring element formed separately from the retaining element which is designed to exert a spring force on the securing element such that the securing element is preloaded in the direction of the locking position, so that when the plug-in element is inserted into the receiving space of the receiving element, the securing element is displaced out of the release position into the locking position due to the spring force of the spring element, wherein the fluid coupling further comprises a separately formed support element which has a contact portion against which the spring element rests, and
   wherein the support element—is connectable to the receiving element and the spring force of the spring element acts between the support element and the securing element.

2. Fluid coupling according to claim 1, wherein, in the locking position of the securing element, a radially outer side of the contact portion of the support element, viewed with respect to a longitudinal center axis of the receiving element, is substantially flush with a radially outer side of the securing element, also viewed with respect to the longitudinal center axis of the receiving element.

3. Fluid coupling according to claim 1, wherein the retaining element comprises at least one resilient retaining arm which extends parallel to the direction of insertion of the plug-in element into the receiving space, and in that the plug-in element is designed to displace the at least one resilient retaining arm of the retaining element radially outward when the plug-in element is inserted into the receiving space of the receiving element, in order to thus allow a displacement of the securing element out of the release position into the locking position.

4. Fluid coupling according to claim 3, wherein the securing element has at least one projection on that portion which is engaged with the resilient retaining arm in such a way that a displacement of the securing element-out of the release position in the direction of the locking position is prevented, which projection is designed to engage with the resilient retaining arm in such a way that a displacement of the resilient retaining arm radially inward is substantially prevented and/or that a displacement of the portion of the securing element radially outward is substantially prevented.

5. Fluid coupling according to claim 3, wherein the portion of the securing element which is engaged with the resilient retaining arm in such a way that a displacement of the securing element out of the release position in the direction of the locking position is prevented passes outward through an opening in the receiving element in the locking position of the securing element, wherein the opening on the receiving element is arranged on a side diametrically opposite the spring element.

6. Fluid coupling according to claim 3, wherein the retaining arm tapers towards a free end and/or a radially outer side of the retaining arm with respect to a longitudinal center axis of the receiving element has a step-at which the outer side, viewed in a direction towards the free end, recedes radially inwards.

7. Fluid coupling according to claim 1, wherein the spring element is a helical spring which is made of a metal.

8. Fluid coupling according to claim 1, wherein the support element is designed to be latched to the receiving element in such a way that the support element is connected to the receiving element such that the support element cannot be detached non-destructively.

9. Fluid coupling according to claim 1, wherein the receiving element has at least one through-opening which extends from an outer side radially inward and substantially orthogonal to both a direction of insertion of the plug-in element into the receiving element and to a direction of displacement of the securing element.

10. Fluid coupling according to claim 1, wherein in a state in which the securing element is arranged on the receiving element, in the locking position, a free space is arranged between a portion of the securing element and the support element, which free space is suitable for inserting a tool in order to thereby displace the securing element from the locking position into the release position.

11. Fluid coupling according to claim 1, wherein a securing portion of the securing element, which in the locking position of the securing element engages with a counter-element of the plug-in element, viewed along the direction of insertion of the plug-in element into the receiving element, has a greater longitudinal extension than a longitudinal extension of the counter-element.

12. Fluid coupling according to claim 1, wherein the retaining element is formed as a component separate from the receiving element and is designed to latch with the receiving element.

13. Fluid coupling according to claim 12, wherein the retaining element is designed to latch with the receiving element using at least two latching pairs.

14. Fluid coupling according to claim 1, wherein the retaining element has at least two projections which are designed to engage in at least two corresponding recesses of the receiving element in order to provide guidance of the retaining element during insertion into the receiving element.

15. Fluid coupling according to claim 14, wherein the recesses of the receiving element extend into the receiving element substantially parallel to the direction of insertion of the plug-in element into the receiving element.

* * * * *